US009604533B2

(12) United States Patent
Itoh

(10) Patent No.: US 9,604,533 B2
(45) Date of Patent: Mar. 28, 2017

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Takao Itoh, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/746,887

(22) Filed: Jun. 23, 2015

(65) Prior Publication Data
US 2015/0367723 A1 Dec. 24, 2015

(30) Foreign Application Priority Data
Jun. 24, 2014 (JP) ................................ 2014-129093

(51) Int. Cl.
*B60K 11/08* (2006.01)
*B60K 6/44* (2007.10)

(52) U.S. Cl.
CPC ............. *B60K 11/085* (2013.01); *B60K 6/44* (2013.01); *Y02T 10/623* (2013.01); *Y02T 10/6239* (2013.01); *Y02T 10/6243* (2013.01); *Y02T 10/7005* (2013.01); *Y02T 10/7077* (2013.01); *Y02T 10/7275* (2013.01); *Y10S 903/904* (2013.01)

(58) Field of Classification Search
CPC B60K 11/085; B60K 6/44; B60K 2015/0319; B60Y 2200/92; Y10S 903/904; F01P 1/08
USPC .......................... 701/22; 180/65.265, 65.275
See application file for complete search history.

(56) References Cited

U.S. PATENT DOCUMENTS

2015/0158378 A1* 6/2015 Dudar .................... B60K 15/03
701/22
2016/0109163 A1* 4/2016 Enomoto .............. F25B 25/005
62/160

FOREIGN PATENT DOCUMENTS

| JP | 2002-051401 A | 2/2002 |
| JP | 2004-180461 A | 6/2004 |
| JP | 2007-22297 | 2/2007 |
| JP | 2011-98596 | 5/2011 |
| JP | 2011-229284 | 11/2011 |

* cited by examiner

*Primary Examiner* — Dalena Tran
(74) *Attorney, Agent, or Firm* — Finnegan, Henderson, Farabow, Garrett & Dunner, LLP

(57) ABSTRACT

A vehicle includes an electric power storage device, motors, a grille shutter and at least one ECU. The ECU is configured to: (i) control the motors and the grille shutter, (ii) calculate the SOC of an electric power storage device, and (iii) execute opening control of the grille shutter such that a first amount of the air exceeds a second amount of the air. The first amount of the air is an amount of the air introduced into the vehicle from the outside of the vehicle when the SOC exceeds a predetermined value. The second amount of the air is an amount of the air introduced into the vehicle from the outside of the vehicle when the SOC does not exceed the predetermined value.

12 Claims, 8 Drawing Sheets

VEHICLE AND CONTROL METHOD FOR VEHICLE

INCORPORATION BY REFERENCE

The disclosure of Japanese Patent Application No. 2014-129093 filed on Jun. 24, 2014 including the specification, drawings and abstract is incorporated herein by reference in its entirety.

BACKGROUND OF THE INVENTION

1. Field of the Invention

The invention relates to a vehicle that is provided with an electric power storage device and a grille shutter, and a control method for the vehicle.

2. Description of Related Art

A grille shutter, which is disposed in a front grille in the front of a vehicle, is used to adjust the amount of air outside the vehicle (traveling wind) which is introduced into the vehicle during the traveling. When the grille shutter is in a closed state, the amount of the air that is introduced into the vehicle is decreased, and thus air resistance is reduced. Then, fuel economy can be improved.

In a vehicle whose engine is intermittently stopped during the traveling, examples of which include a hybrid car, the temperature of the engine becomes less likely to decrease while the engine is stopped when the grille shutter is in a closed state. Then, fuel economy can be improved because the amount of the fuel consumed in order to warm up the engine is reduced. As described above, a grille shutter in general is controlled in view of fuel economy improvement.

Control for adjusting the degree of opening of a grille shutter in accordance with the temperature of an engine has been proposed in order to prevent the overheating of the engine. For example, the hybrid car that is disclosed in Japanese Patent Application Publication No. 2007-22297 is provided with a radiator, traveling wind introduction means capable of adjusting traveling wind introduction into the radiator, and traveling wind introduction control means for controlling the traveling wind introduction means. When the temperature of the engine exceeds a predetermined temperature, the traveling wind introduction control means controls the traveling wind introduction means so that more traveling wind is introduced into the radiator. Then, the radiator is cooled and the engine becomes less likely to have a higher-than-necessary temperature.

SUMMARY OF THE INVENTION

Grille shutter control for fuel economy improvement or overheating prevention has been known as described above. However, grille shutter control for managing the state of charge (SOC) of an electric power storage device in a vehicle on which the electric power storage device is mounted, examples of which include an electric car and a hybrid car, has not been considered in the related art.

The inventor has found that the SOC of the electric power storage device can be adjusted and the SOC can be appropriately managed by changing energy efficiency through the opening and closing of a grille shutter.

The invention provides a vehicle and a control method for the vehicle that appropriately manage the SOC of an electric power storage device by using a grille shutter in the vehicle that is provided with the electric power storage device and the grille shutter.

A first aspect of the invention provides a vehicle that includes an electric power storage device, electric motors, a grille shutter and at least one electronic control unit. The electric motors are configured to generate driving force fir the vehicle by using an electric power stored in the electric power storage device. The grille shutter is configured to introduce air into the vehicle from the outside of the vehicle. The electronic control unit is configured to: (i) control the electric motors and the grille shutter, (ii) calculate a state of charge of the electric power storage device; and (iii) execute opening control of the grille shutter such that a first amount of the air exceeds a second amount of the air, the first amount of the air being an amount of the air introduced into the vehicle from the outside of the vehicle when the state of charge of the electric power storage device exceeds a predetermined value, and the second amount of the air being an amount of the air introduced into the vehicle from the outside of the vehicle when the state of charge does not exceed the predetermined value.

The air resistance of the vehicle increases as the amount of the air that is introduced into the vehicle from the outside of the vehicle increases. Accordingly, the electric motor needs to generate a greater driving force, and thus the amount of the electric power that is supplied from the electric power storage device to the electric motor increases. As a result, the SOC of the electric power storage device is reduced, and the SOC can be managed within an appropriate range to avoid an over-charged state in a case where the electric power storage device is in a state close to a fully-charged state with the SOC being at a high level.

In the vehicle, the electronic control unit may be configured to adjust the amount of the air introduced into the vehicle from the outside of the vehicle depending on a frequency of the opening of the grille shutter. The electronic control unit may be configured to perform the opening control such that a first frequency of the opening of the grille shutter exceeds a second frequency of the opening of the grille shutter, the first frequency is the frequency of the opening of the grille shutter when the state of charge of the electric power storage device exceeds the predetermined value, and the second frequency is the frequency of the opening of the grille shutter when the state of charge does not exceed the predetermined value.

In the vehicle, the electronic control unit may be configured to adjust the amount of the air introduced into the vehicle from the outside of the vehicle depending on degree of the opening of the grille shutter. The electronic control unit may be configured to perform the opening control such that a first degree of the opening of the grille shutter exceeds a second degree of the opening of the grille shutter, the first degree is the degree of the opening of the grille shutter when the state of charge of the electric power storage device exceeds the predetermined value, and the second degree is the degree of the opening of the grille shutter when the state of charge does not exceed the predetermined value.

In the vehicle, the electronic control unit may be configured to make the opening control less likely to be executed when the driving force output from the electric motors is limited than when the driving force output from the electric motors is not limited.

In the vehicle, the electronic control unit may be configured to make the opening control less likely to be executed when the electric power supplied from the electric power storage device to the electric motors does not exceed a predetermined reference value than when the electric power supplied from the electric power storage device to the electric motors exceeds the predetermined reference value.

The vehicle further includes an internal combustion engine. The electronic control unit may be configured to make the opening control less likely to be executed when a driving force output from the internal combustion engine is limited than when the driving force output from the internal combustion engine is not limited.

The driving force allowed to be output from the vehicle may be reduced in a case where the driving force allowed to be output from the electric motor is limited (for example, in a case where the electric motor is in an overheated state), in a case where the electric power allowed to be supplied from the electric power storage device does not exceed the predetermined reference value (for example, when the electric power storage device has a high temperature or a low temperature), or in a case where the driving force allowed to be output from the internal combustion engine is limited (for example, in a case where an abnormality occurs in the internal combustion engine). The execution of the opening control under such a situation causes the air resistance to increase and causes a load on the vehicle to increase, and thus it may be impossible to achieve the driving force that is required for the traveling. According to the configuration described above, the opening control is less likely to be executed (for example, prohibited) in a case where a situation occurs in which the driving force allowed to be output from the vehicle is reduced. Accordingly, the driving force that is required for the traveling can be achieved with higher reliability.

In the vehicle, the electronic control unit may be configured to make the opening, control less likely to be executed when an amount of remaining fuel for the internal combustion engine does not exceed a predetermined threshold than when the amount of remaining fuel exceeds the predetermined threshold. If the opening control is executed despite the small amount of the remaining fuel for the internal combustion engine, the amount of fuel consumption increases due to an increase in the air resistance, and thus the amount of the fuel may become insufficient. According to the configuration described above, the opening control is less likely to be executed in a case where the amount of the remaining fuel for the internal combustion engine does not exceed the predetermined threshold. Then, an increase in the amount of fuel consumption is prevented, and thus the shortage of the fuel becomes less likely to occur. Accordingly, a required traveling distance can be achieved.

In the vehicle, the electronic control unit may be configured to make the opening control less likely to be executed when an amount of remaining fuel for the internal combustion engine does not exceed a predetermined threshold than when the amount of remaining fuel exceeds the predetermined threshold.

In the vehicle, the electronic control unit may be configured to perform control such that a condition for opening the grille shutter is relaxed when the state of charge does not exceed the predetermined value, compared to a condition for opening the grille shutter when the state of charge exceeds the predetermined value.

A second aspect of the invention provides a control method for a vehicle. The vehicle includes an electric power storage device, electric motors, a grille shutter and an electronic control unit. The electric motors are configured to generate driving force for the vehicle by using an electric power stored in the electric power storage device. The grille shutter is configured to introduce air into the vehicle from the outside of the vehicle. The control method includes: computing a state of charge of the electric power storage device, by the electronic control unit; and controlling the grille shutter, by the electronic control unit, such that a first amount of the air exceeds a second amount of the air, the first amount of the air being an amount of the air introduced into the vehicle from the outside of the vehicle when the state of charge of the electric power storage device exceeds a predetermined value, and the second amount of the air being an amount of the air introduced into the vehicle from the outside of the vehicle when the state of charge does not exceed the predetermined value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
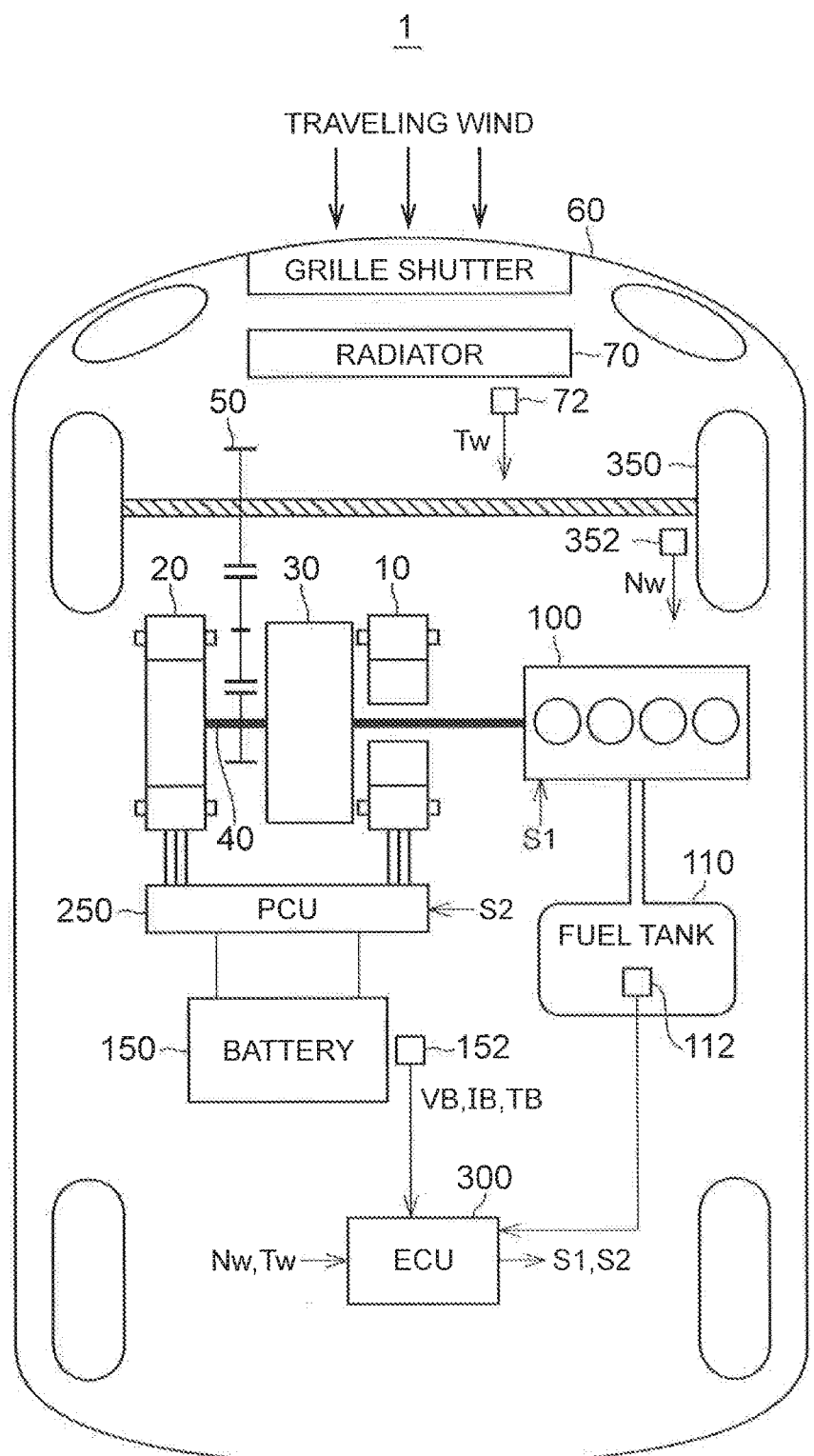
FIG. 1 is a block diagram schematically illustrating an overall configuration of a vehicle according to a first embodiment.

Hereinafter, embodiments of the invention will be described in detail with reference to accompanying drawings. Like reference numerals will be used to refer to like or corresponding parts in the drawings and description thereof will not be repeated.

In the following description of the embodiments, a hybrid car will be described as an exemplary form of a vehicle according to the invention. However, the vehicle to which the invention can be applied is not limited thereto insofar as a battery is mounted on the vehicle. In other words, the vehicle according to the invention may be an electric car or may be a plug-in hybrid car that is configured to allow electric power to be supplied to the battery from the outside of the vehicle.

[First Embodiment] <Configuration of Vehicle> FIG. 1 is a block diagram schematically illustrating an overall configuration of a vehicle according to a first embodiment. Referring to FIG 1, a vehicle 1 is provided with an engine 100, a first motor generator 10, a second motor generator 20, a power split mechanism 30, a drive shaft 40, a decelerator 50, a battery 150, a power control unit (PCU) 250, an electronic control unit (ECU) 300, and a driving wheel 350.

The engine 100 is an internal combustion engine such as a gasoline engine and a diesel engine. The engine 100 outputs a driving three, in response to a control signal S1 from the ECU 300, for the traveling of the vehicle 1.

A fuel tank 110 is connected to the engine 100. A fuel for the engine 100, such as gasoline, ethanol, and propane gas, is stored in the fuel tank 110. A fuel gauge 112 is disposed in the fuel tank 110. The fuel gauge 112 detects the amount of the fuel remaining in the fuel tank 110 and outputs the result of the detection to the ECU 300.

Each of the first motor generator 10 and the second motor generator 20 is, for example, a three-phase AC rotary electric machine in which a permanent magnet is embedded in a rotor (none of which is illustrated herein). Each of the first motor generator 10 and the second motor generator 20 is driven by the PCU 250.

The first motor generator 10 is connected to a crankshaft (not illustrated) of the engine 100 via the power split mechanism 30. When the engine 100 is started, the first motor generator 10 rotates the crankshaft of the engine 100 by using the electric power of the battery 150. In addition, the first motor generator 10 can generate electric power by using the power of the engine 100. The AC electric power that is generated by the first motor generator 10 is converted into DC electric power by the PCU 250, and the battery 150 is charged therewith. In addition, the AC electric power that is generated by the first motor generator 10 is supplied to the second motor generator 20 in some cases.

The second motor generator 20 rotates the drive shaft 40 by using at least one of the electric power from the battery 150 and the electric power that is generated by the first motor generator 10. In addition, the second motor generator 20 can generate electric power by regenerative braking. The AC electric power that is generated by the second motor generator 20 is converted into DC electric power by the PCU 250, and the battery 150 is charged therewith.

The power split mechanism 30 is a power transmission device that mechanically connects the three elements of the crankshaft of the engine 100, a rotating shaft (not illustrated) of the first motor generator 10, and the drive shaft 40. The power split mechanism 30 allows power to be transmitted between any two of the three elements by using the other one as a reaction force element.

The drive shaft 40 is connected to the driving wheel 350 via the decelerator 50. The decelerator 50 transmits the power from the power split mechanism 30 or the second motor generator 20 to the driving wheel 350. In addition, a reaction force from a road surface that is received by the driving wheel 350 is transmitted to the second motor generator 20 via the decelerator 50 and the power split mechanism 30. In this manner, the second motor generator 20 generates electric power during the regenerative braking.

The PCU 250 converts the DC electric power that is stored in the battery 150 into AC electric power and supplies the AC electric power to the first motor generator 10 and the second motor generator 20. In addition, the PCU 250 converts the AC electric power that is generated by the first motor generator 10 and the second motor generator 20 into DC electric power and supplies the DC electric power to the battery 150. The PCU 250 is controlled in accordance with a control signal S2 from the ECU 300.

The battery 150 is an electric power storage device that is configured to be rechargeable. For example, a secondary battery such as a nickel-hydrogen battery and a lithium-ion battery or a capacitor such as an electric double layer capacitor can be adopted as the battery 150.

A battery sensor 152 is disposed in the battery 150. The battery sensor 152 comprehensively refers to a current sensor, a voltage sensor, and a temperature sensor (none of which is illustrated herein). The voltage sensor detects the voltage (battery voltage) VB of the battery 150. The current sensor detects the current (input and output current) VB input into and output from the battery 150. The temperature sensor detects the temperature (battery temperature) TB of the battery 150. Each of the sensors outputs the result of the detection to the ECU 300. The ECU 300 computes the state of charge (SOC) of the battery 150 based on the battery voltage VB, the input and output current IB, and the battery temperature TB of the battery 150.

A grille shutter 60 is disposed in a front grille in the front of the vehicle 1. The configuration of the grille shutter 60 will be described later.

A radiator 70 dissipates the heat of a coolant for cooling the engine 100, the first motor generator 10, and the second motor generator 20. In FIG. 1, the radiator for the engine 100 and the radiator for the first motor generator 10 and the second motor generator 20 are illustrated as integrally configured as the radiator 70. However, the radiator for the engine 100 and the radiator for the first motor generator 10 and the second motor generator 20 may be configured separately.

A water temperature sensor 72 is disposed in a cooling system (not illustrated) of the engine 100. The water temperature sensor 72 detects the temperature (coolant temperature) Tw of the coolant flowing through the cooling system and outputs the result of the detection to the ECU 300. The ECU 300 determines, based on the coolant temperature Tw, whether or not the engine 100 needs to be warmed up.

A rotation sensor 352 is disposed in a hub or a knuckle (not illustrated) of the driving wheel 350. The rotation sensor 352 detects the rotation speed Nw of the driving wheel 350 and outputs the result of the detection to the ECU 300. The ECU 300 calculates the vehicle speed V of the vehicle 1 based on the rotation speed Nw of the driving wheel 350.

The ECU 300 includes a central processing unit (CPU), a memory, and a buffer (none of which is illustrated herein). The ECU 300 controls equipment, based on the signals sent from the respective sensors and a map and a program stored in the memory, so that the vehicle 1 is in a desired state.

Figure 2:
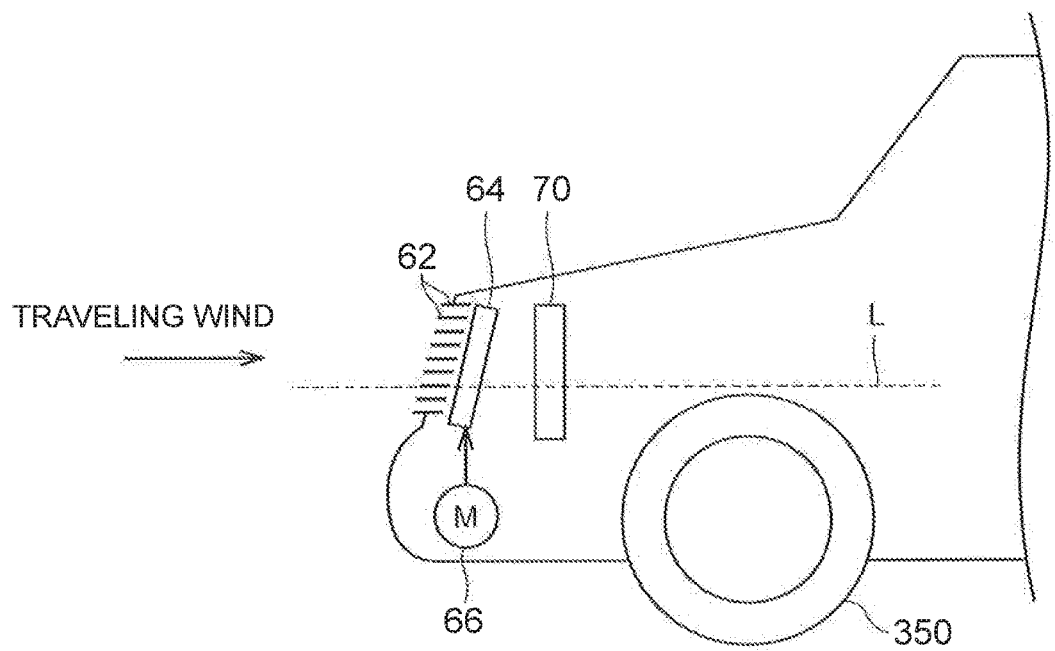
FIG. 2 is a sectional view of the vehicle schematically illustrating the configuration of the grille shutter that is illustrated in FIG. 1.

FIG. 2 is a sectional view of the vehicle schematically illustrating the configuration of the grille shutter 60 that is illustrated in FIG. 1. Referring to FIG. 2, the grille shutter 60 includes a plurality of this 62, a rotating mechanism 64 that allows the plurality of fins 62 to rotate in conjunction with each other, and a motor 66 as a driving source for the rotating mechanism 64. The motor 66 is driven based on control by the ECU 300. The grille shutter 60 is configured for the degree of opening to be adjustable by the driving of the motor 66. During the traveling of the vehicle 1, air is introduced into the vehicle 1 from the outside of the vehicle 1 with the amount of the introduced air depending on the degree of opening. The degree of opening of the grille shutter 60 is represented by, for example, the angle that is formed by a traveling direction L of the vehicle and the respective fins 62.

<Opening Control> It is generally known that the progress of battery deterioration is accelerated in a case where the battery is in a fully-charged state or in a state close to the fully-charged state. In this case, the battery becomes more likely to reach an over-charged state. Accordingly, from the point of view of battery protection, it is desirable to avoid a state where an excessively high SOC is maintained and to reduce the SOC so that the SOC is within an appropriate range.

According to this embodiment, the grille shutter 60 is controlled so that the frequency of the opening of the grille shutter 60 or the degree of the opening of the grille shutter 60 increases, compared to a case where the SOC of the battery 150 is equal to or less than a predetermined value, in a case where the SOC of the battery 150 exceeds the predetermined value. Hereinafter, this control will be referred to as opening control.

The execution of the opening control causes air resistance to increase and causes a load on the vehicle 1 to increase. Accordingly, the second motor generator 20 needs to generate a greater driving force, and thus the amount of the electric power that is supplied from the battery 150 to the second motor generator 20 increases. As a result, the SOC of the battery 150 is reduced, and the SOC can be managed within an appropriate range.

Figure 3:
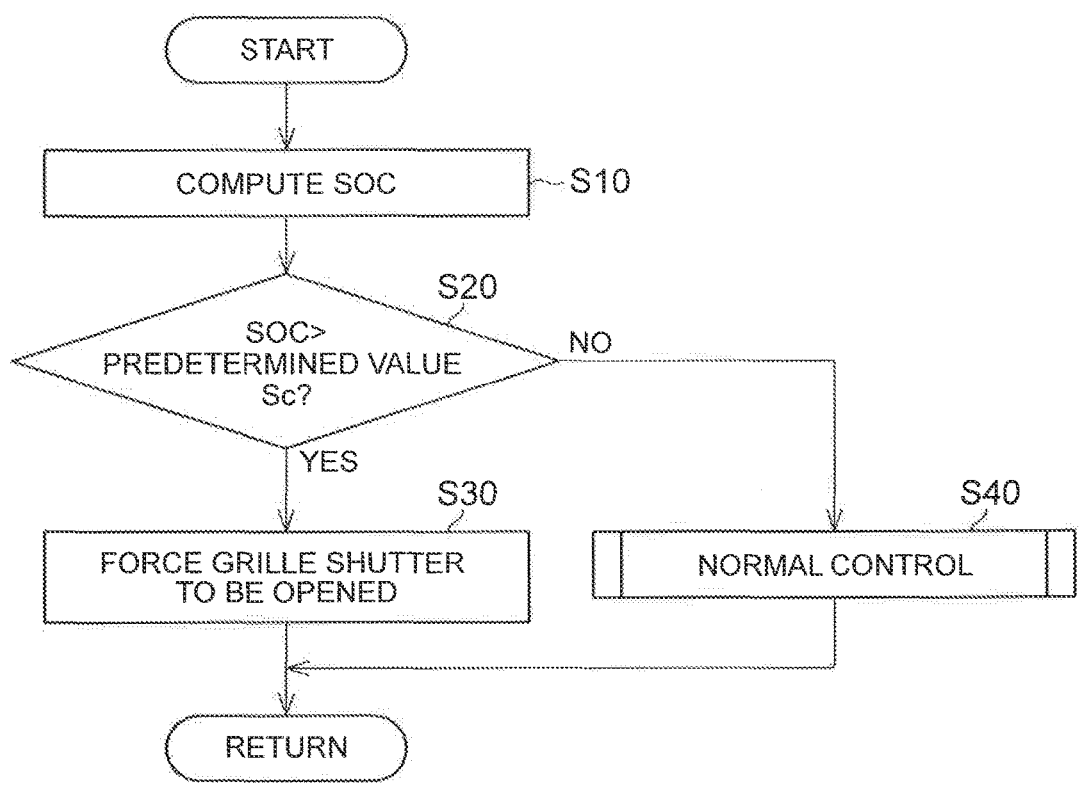
FIG. 3 is a flowchart for showing opening control for the grille shutter according to the first embodiment.

FIG. 3 is a flowchart for showing the opening control for the grille shutter 60 according to the first embodiment. Referring to FIG. 3, this flowchart is executed, called from the main routine, when a predetermined condition is satisfied or each time a predetermined period of time elapses. Basically, each step in the flowchart is realized by software processing by the ECU 300. However, each step in the flowchart may be realized by manufactured hardware (electronic circuit) in the ECU 300.

In Step (hereinafter, simply referred to as S) 10, the ECU 300 computes the SOC of the battery 150 based on the battery voltage VB, the input and output current IB, and the battery temperature TB from the battery sensor 152.

In S20, the ECU 300 determines whether or not the SOC exceeds a predetermined value Sc. It is preferable that the predetermined value Sc is set to a value that exceeds the upper limit value of the appropriate SOC range and is exceeded by (for example, 80% of) the SOC at which the battery 150 is in the over-charged state.

In a case where the SOC exceeds the predetermined value Sc (YES in S20), the processing proceeds to S30 and the ECU 300 threes the grille shutter 60 to be opened for maintains the open state). Then, the air resistance of the vehicle 1 increases, and the amount of electric power consumption by the second motor generator 20 increases. As a result, the SOC of the battery 150 can be reduced.

In a case where the SOC is equal to or less than the predetermined value Sc (NO in S20), the processing proceeds to S40, and the ECU 300 executes normal control for the grille shutter 60.

Figure 4:
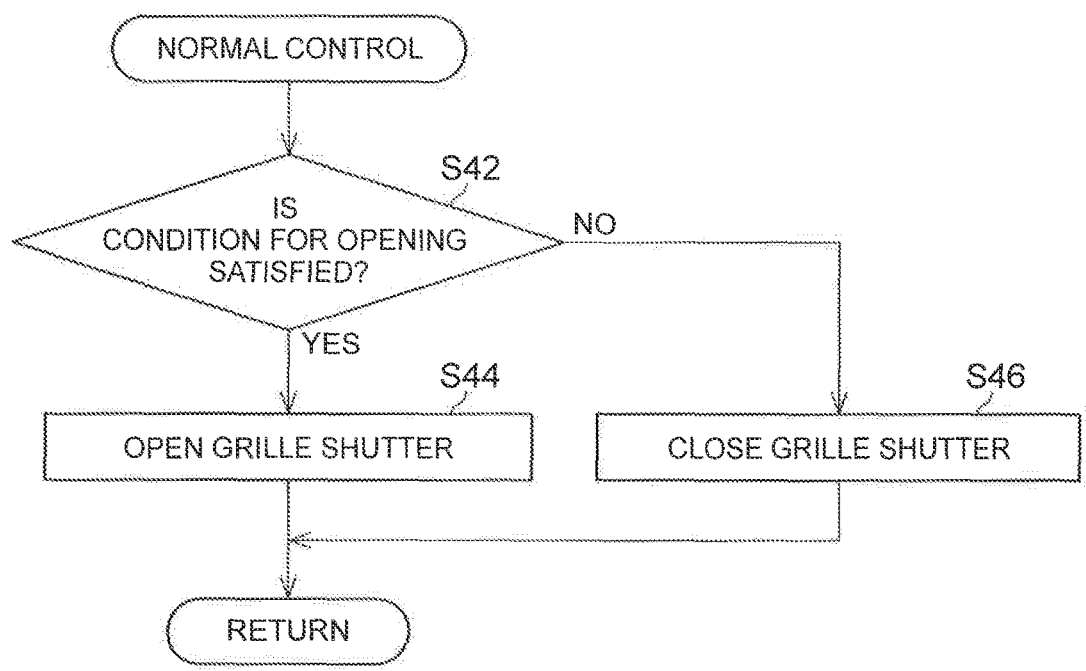
FIG. 4 is a flowchart for showing the normal control that is illustrated in FIG. 3.

FIG. 4 is a flowchart for showing the normal control that is illustrated in FIG. 3. Referring to FIGS. 3 and 4, the ECU 300 determines in S42 whether or not a predetermined condition for the opening of the grille shutter 60 is satisfied.

In a case where the predetermined condition is satisfied (YES in S42), the processing proceeds to S44, and the ECU 300 opens the grille shutter 60. In a case where the predetermined condition is not satisfied (NO in S42), the processing proceeds to S46, and the ECU 300 closes the grille shutter 60. As an example, the ECU 300 opens the grille shutter 60 in a case where the engine temperature is high (for example, in a case where the coolant temperature Tw exceeds a predetermined value) and closes the grille shutter 60 in a case where the engine temperature is low (in a case where the coolant temperature Tw does not exceed the predetermined value). The processing returns to the main routine after the processing of S30 or S40 is terminated.

According to the first embodiment, the grille shutter 60 is forced to be opened as described above in a case where the SOC of the battery 150 exceeds the predetermined value Sc. In this case, the frequency of the opening of the grille shutter 60 increases compared to a case where the SOC does not exceed the predetermined value Sc. Since the air resistance of the vehicle 1 is actively increased, the amount of electric power consumption by the second motor generator 20 increases, and thus the SOC of the battery 150 can be reduced. Accordingly, a state where the SOC becomes excessive can be avoided, and thus the deterioration of the battery 150 can become less likely to proceed and the battery 150 can be prevented from reaching an over-charged state.

[Second Embodiment] As the air resistance increases, a greater driving force is required for the traveling of the vehicle. Accordingly, in the second embodiment, a configuration will be described in which the opening control becomes less likely to be executed in a case where, for example, a driving force that can be output from the vehicle is reduced due to an abnormality occurring in a driving system. The configuration of the vehicle according to the second embodiment is identical to the configuration of the vehicle 1 illustrated in FIG. 1, and thus detailed description thereof will not be repeated.

Figure 5:
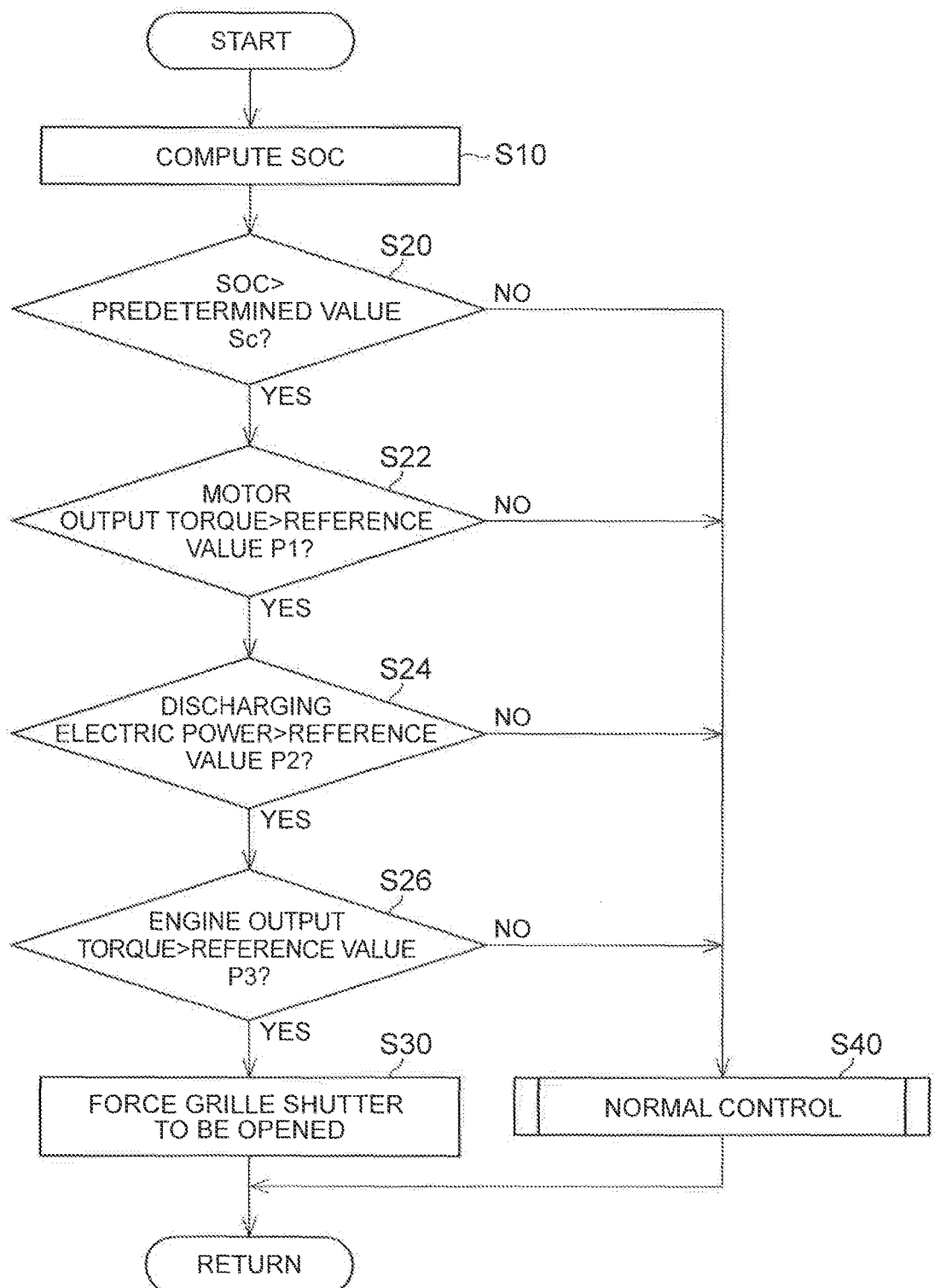
FIG. 5 is a flowchart for showing opening control for a grille shutter according to a second embodiment.

FIG. 5 is a flowchart for showing opening control for the grille shutter 60 according to the second embodiment. Referring to FIG. 5, this flowchart differs from the flowchart illustrated in FIG. 3 in that the processing of S22, S24, and S26 are added thereto. The rest of the processing is identical to the corresponding processing in the flowchart illustrated in FIG. 3, and thus detailed description thereof will not be repeated.

Each of the processing of S22, S24, and S26 corresponds to processing for determining whether or not the driving force that can be output from the vehicle 1 is reduced (or whether or not the driving force may be reduced).

More specifically, in S22, the ECU 300 determines whether or not the torque that can be output from the first motor generator 10 or the second motor generator 20 (motor output torque) exceeds a predetermined reference value P1, that is, whether or not the motor output torque is limited. In a case where the motor output torque exceeds the reference value P1 (YES in S22), the processing proceeds to S24 with the motor output torque determined not to be limited. In a case where the motor output torque does not exceed the reference value P1 (NO in S22), the processing proceeds to S40 with the motor output torque determined to be limited.

Examples of the factors limiting the motor output torque include a case where an element constituting the first motor generator 10, the second motor generator 20, or the PCU 250 (for example, a boost converter (not illustrated)) is in an overheated state, a case where the upper limit value of the voltage boosted by the boost converter is limited, and a case where the performance of the cooling of the first motor generator 10 by the radiator 70 is reduced (for example, when the temperature of the coolant flowing through the radiator 70 is equal to or higher than a predetermined value).

In S24, the ECU 300 determines whether or not the electric power that can be supplied from the battery 150 to the first motor generator 10 or the second motor generator 20 exceeds a predetermined reference value P2. In a case where the electric power exceeds the reference value P2 (YES in S24), the processing proceeds to S26 with the supply of sufficient electric power from the battery 150 determined to be possible. In a case where the electric power supplied from the battery 150 does not exceed the reference value P2 (NO in S24), it is determined that the supply of the electric power from the battery 150 may be insufficient and the processing proceeds to S40.

Examples of the factors limiting the supply of the electric power from the battery 150 include a case where the discharge-allowing electric power Wout of the battery 150 does not exceed a predetermined value (a case where the battery 150 has a high temperature or a low temperature or the SOC of the battery 150 does not exceed a specified value) and a case where the performance of the cooling of the battery 150 is reduced (for example, a case where a cooling blower (not illustrated) of the battery 150 is malfunctioning, or the temperature of the air suctioned by the cooling blower is equal to or higher than a predetermined value).

In S26, the ECU 300 determines whether or not the torque that can be output from the engine 100 (engine output torque) exceeds a reference value P3, that is, whether or not the engine output torque is limited. In a case where the engine output torque exceeds the reference value P3 (YES in S26), the processing proceeds to S30 with the engine output torque determined not to be limited. In a case where the engine output torque does not exceed the reference value P3 (NO in S26), the processing proceeds to S40 with the engine output torque determined to be limited.

Examples of the factors limiting the engine output torque include a case where an abnormality occurs in an element constituting the engine 100 (for example, a variable valve mechanism, a spark plug, and a throttle (none of which is illustrated herein)), a case where the coolant temperature Tw in the engine 100 is equal to or higher than a predetermined value, and a case where the performance of the cooling of the engine 100 by the radiator 70 is reduced (for example, when a radiator fan (not illustrated) is malfunctioning).

In S30, the driving force that can be output from the vehicle 1 is not reduced, and thus it is highly likely that the driving force required for the traveling of the vehicle 1 can be achieved even if the load on the vehicle 1 increases. Accordingly, the grille shutter 60 is forced to be opened. Then, the air resistance increases, the load on the vehicle 1 increases, and thus the SOC of the battery 150 can be reduced. As a result, a state where the SOC becomes excessive can be avoided, and thus the deterioration of the battery 150 can become less likely to proceed and the battery 150 can be prevented from reaching an over-charged state.

In contrast, the processing proceeds to S40 in a case where the motor output torque does not exceed the reference value P1 as described above (NO in S22), in a case where the electric power that can be supplied from the battery 150 does not exceed the reference value P2 (NO in S24), or in a case where the engine output torque does not exceed the reference value P3 (NO in S26).

In S40, the driving force that can be output from the vehicle 1 is reduced (or is highly likely to be reduced), and thus the execution of the opening control may make it impossible to achieve the driving force required for the traveling of the vehicle 1. Accordingly, the ECU 300 executes the normal control for the grille shutter 60.

According to the second embodiment, the opening control is less likely to be executed as described above in a case where the driving force that can be output from the vehicle 1 is reduced due to, for example, a limited motor output torque. Accordingly, an increase in the load on the vehicle 1 resulting from an increase in the air resistance is prevented, and thus the driving force required for the traveling of the vehicle 1 can be achieved with higher reliability.

[Third Embodiment] When the opening control is executed, the load on the vehicle increases, and thus the amount of fuel consumption by the engine increases. In the third embodiment, a configuration will be described in which the execution or non-execution of the opening control for the grille shutter is determined based on the amount of the fuel remaining in the fuel tank. The configuration of the vehicle according to the third embodiment is identical to the configuration of the vehicle 1 illustrated in FIG. 1, and thus detailed description thereof will not be repeated.

Figure 6:
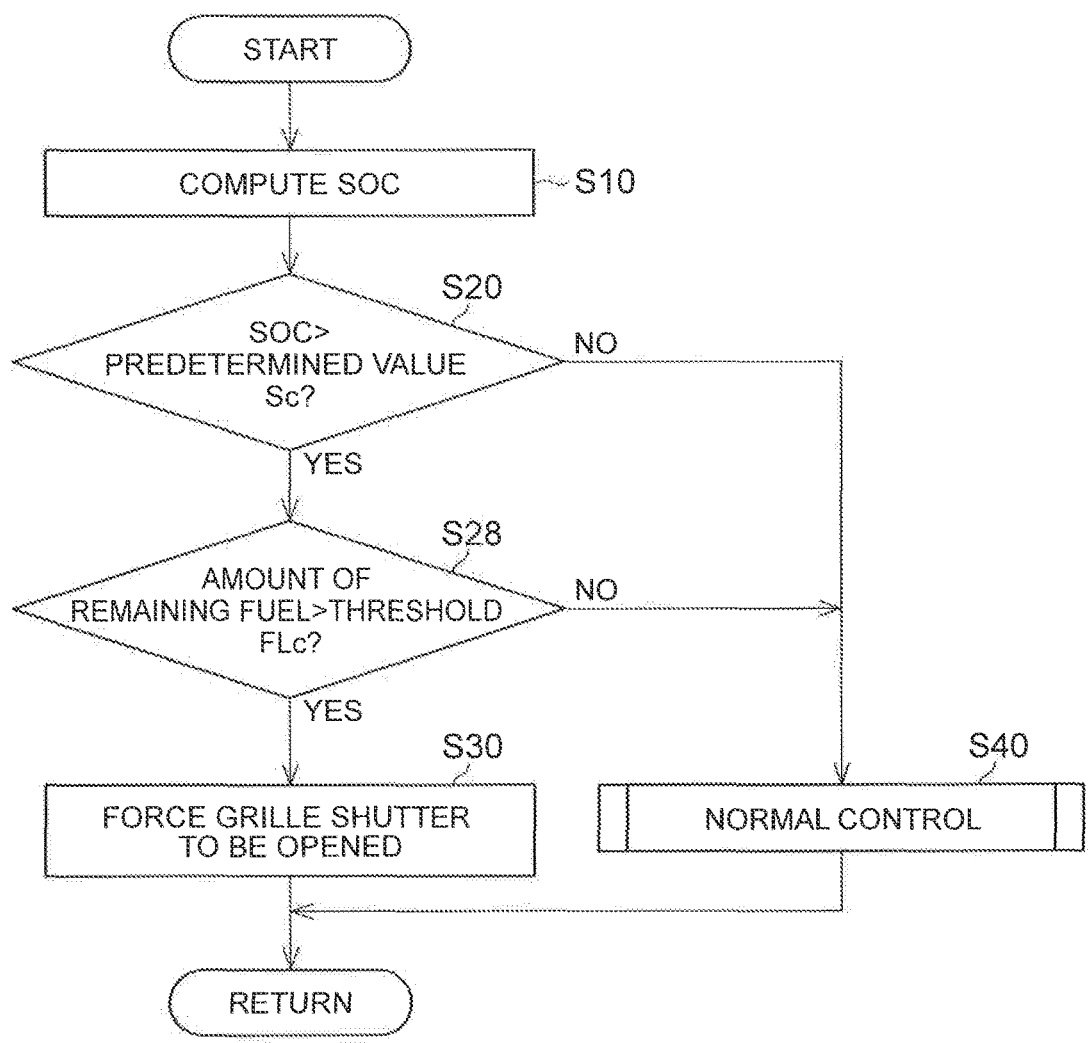
FIG. 6 is a flowchart for showing opening control for a grille shutter according to a third embodiment.

FIG. 6 is a flowchart for showing opening control for the grille shutter 60 according to the third embodiment. Referring to FIG. 6, this flowchart differs from the flowchart illustrated in FIG. 3 in that the processing of S28 is added thereto. The rest of the processing is identical to the corresponding processing in the flowchart illustrated in FIG. 3, and thus detailed description thereof will not be repeated.

In S28, the ECU 300 determines, based on the result of the detection of the amount of the remaining fuel by the fuel gauge 112, whether or not the amount of the remaining fuel exceeds a threshold FLc (for example, the value that is available when a fuel gauge (not illustrated) indicates empty).

In a case where the amount of the remaining fuel exceeds the threshold FLc (YES in S28), the processing proceeds to S30, and the ECU 300 forces the grille shutter 60 to be opened with a sufficient amount of the fuel determined to be stored in the fuel tank 110.

In a case where the amount of the remaining fuel does not exceed the threshold FLc (NO in S28), the processing proceeds to S40, and the ECU 300 executes the normal control for the grille shutter 60 with a small amount of the fuel determined to be remaining in the fuel tank 110.

If the grille shutter 60 is opened despite the small amount of the remaining fuel, the amount of fuel consumption increases due to an increase in the air resistance, and thus the amount of the fuel may become insufficient. Accordingly, the opening control is less likely to be executed in a case where the amount of the remaining fuel does not exceed the threshold FLc according to the third embodiment. Accordingly, an increase in the amount of fuel consumption is prevented, and thus the shortage of the fuel is less likely to occur. Accordingly, a required traveling distance (for example, a traveling distance to the nearest refueling facility) can be ensured to be achieved.

[Fourth Embodiment] In the first to third embodiments, control for forcing the grille shutter to be opened has been described. However, the manner of the opening control for the grille shutter is not limited thereto. In a fourth embodiment, a condition for determining whether or not to open the grille shutter is relaxed. The configuration of the vehicle according to the fourth embodiment is identical to the configuration of the vehicle 1 illustrated in FIG. 1, and thus detailed description thereof will not be repeated.

Figure 7:
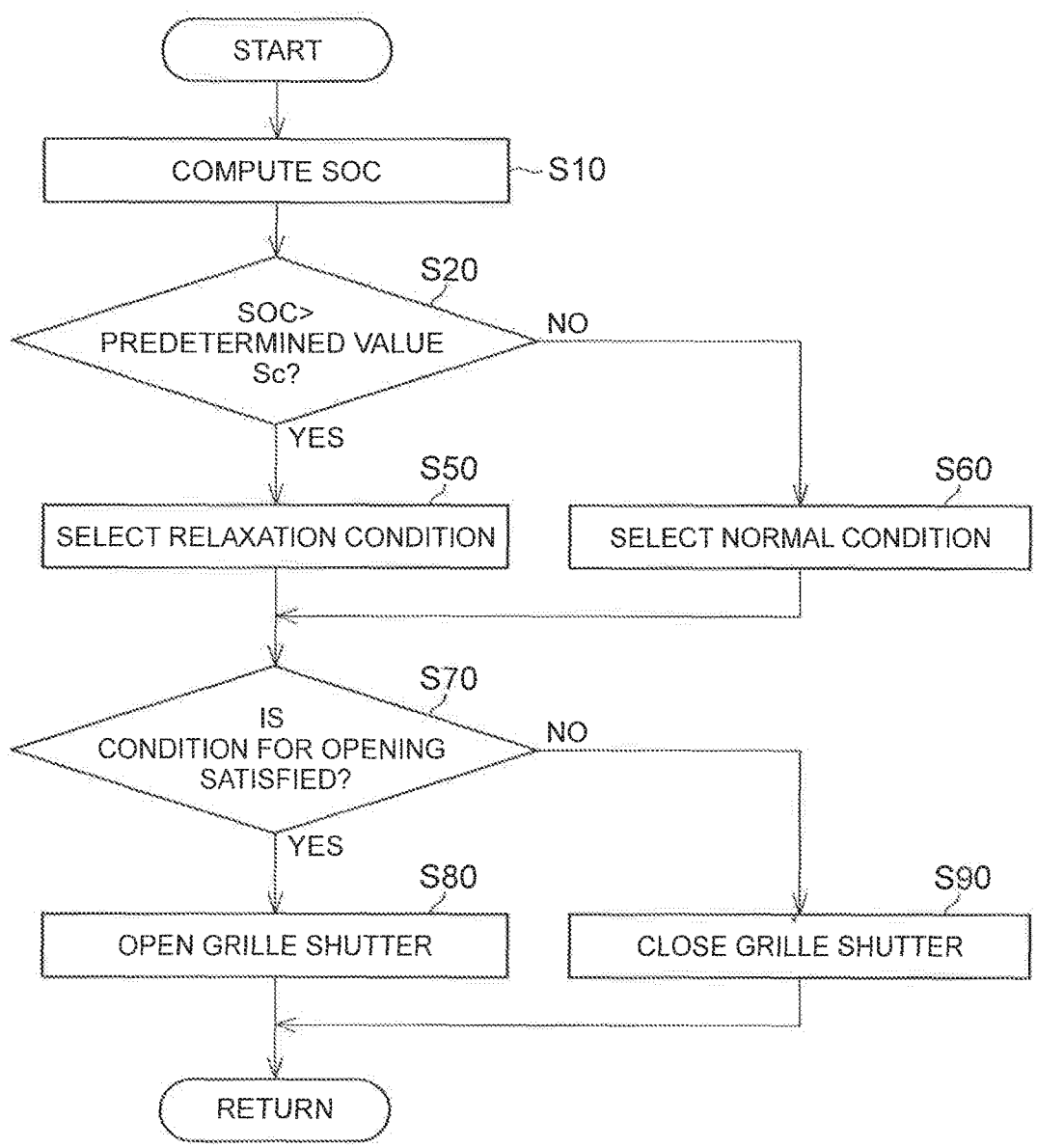
FIG. 7 is a flowchart for showing opening control for a grille shutter according to a fourth embodiment.

FIG. 7 is a flowchart for showing opening control for the grille shutter 60 according to the fourth embodiment. Referring to FIG. 7, this flowchart differs from the flowchart illustrated in FIG. 3 in that the processing of S50 to S90 takes the place of the processing of S30 and S40. The rest of the processing is identical to the corresponding processing in the flowchart illustrated in FIG. 3, and thus detailed description thereof will not be repeated.

In a case where the SOC does not exceed the predetermined value Sc in S20 (NO in S20), the processing proceeds to S60, and the ECU 300 selects a normal condition as a condition used in the processing (S70) for determining whether or not a condition for opening the grille shutter 60 (described later) is satisfied.

In a case where the SOC exceeds the predetermined value Sc (YES in S20), the processing proceeds to S50, and the ECU 300 selects a relaxation condition as a condition used in the determination processing described above. The normal condition and the relaxation condition will be described later.

In S70, the ECU 300 determines whether or not the condition for opening n the grille shutter 60 is satisfied. In other words, the ECU 300 determines whether or not the relaxation condition is satisfied in a case where the relaxation condition is selected in S50 and determines whether or not the normal condition is satisfied in a case where the normal condition is selected in S60.

In a case where the condition for opening the grille shutter 60 is satisfied (YES in S70), the processing proceeds to S80, and the ECU 300 opens the grille shutter 60. In a case where the condition for opening the grille shutter 60 is not satisfied (NO in S70), the processing proceeds to S90, and the ECU 300 closes the grille shutter 60. The processing returns to the main routine after the processing of S80 or S90 is terminated.

Hereinafter, the difference between the normal condition and the relaxation condition will be described. When the relaxation condition is used, the condition for opening the grille shutter 60 is more relaxed than when the normal condition is used.

More specifically, the grille shutter 60 is controlled in accordance with, for example, the vehicle speed V of the vehicle 1 that is calculated based on a detection result from the rotation sensor 352. In a case where the normal condition is used, the ECU 300 determines that the condition for opening the grille shutter 60 is satisfied when the vehicle speed V does not exceed a predetermined value V1. In a case where the relaxation condition is used, in contrast, the ECU 300 determines that the condition for opening the grille shutter 60 is satisfied when the vehicle speed V does not exceed V2 that is higher than the predetermined value V1. In other words, the grille shutter 60 is opened with respect to a wider range of the vehicle speed V in a case where the relaxation condition is used than in a case where the normal condition is used.

As another specific example, control based on the coolant temperature Tw in the engine 100 will be described. In a case where the normal condition is used, the ECU 300 determines that the condition for opening the grille shutter 60 is satisfied when the coolant temperature Tw is equal to or higher than a predetermined value T1. In a case where the relaxation condition is used, in contrast, the ECU 300 determines that the condition for opening the grille shutter 60 is satisfied when the coolant temperature Tw is equal to or higher than T2 that is lower than the predetermined value T1. In other words, the grille shutter 60 is opened with respect to a wider range of the coolant temperature Tw in a case where the relaxation condition is used than in a case where the normal condition is used.

As described above, the grille shutter 60 is opened with respect to a wider parameter range when the relaxation condition is used than when the normal condition is used. Accordingly, the frequency of the opening of the grille shutter 60 increases, the air resistance increases, and thus the amount of electric power consumption by the second motor generator 20 becomes likely to increase. As a result, the SOC of the battery 150 becomes more likely to be reduced. Accordingly, a state where the SOC of the battery 150 becomes excessive can be avoided, and thus the deterioration of the battery 150 can become less likely to proceed and the battery 150 can be prevented from reaching an over-charged state.

The above-described control based on the vehicle speed V or the coolant temperature Tw is merely an example. The normal condition and the relaxation condition can be similarly set with regard to control based on another parameter (for example, the wind pressure of traveling wind).

[Fifth Embodiment] In a fifth embodiment, control for increasing the degree of the opening of the grille shutter will be described as another manner of the opening control for the grille shutter. The configuration of the vehicle according to the fifth embodiment is identical to the configuration of the vehicle 1 illustrated in FIG. 1, and thus detailed description thereof will not be repeated.

Figure 8:
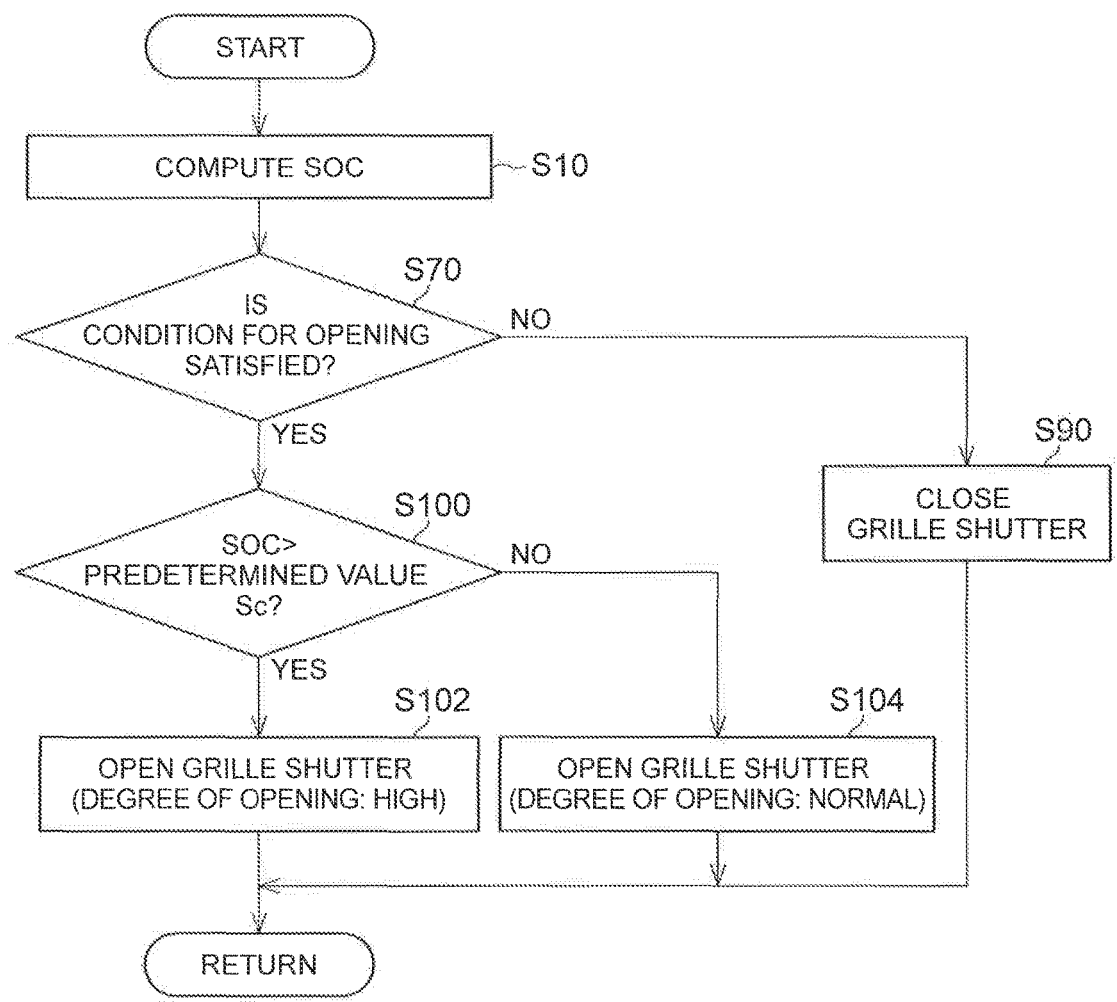
FIG. 8 is a flowchart for showing opening control for a grille shutter according to a fifth embodiment.

FIG. 8 is a flowchart for showing opening control for the grille shutter 60 according to the fifth embodiment. Referring to FIG. 8, the ECU 300 computes the SOC of the battery 150 in S10. Then, the processing proceeds to S70.

In S70, the ECU 300 determines whether or not the condition for opening the grille shutter 60 is satisfied. In a case where the condition for opening the grille shutter 60 is not satisfied (NO in S70), the processing proceeds to S90, and the ECU 300 closes the grille shutter 60. In a case where the condition for opening the grille shutter 60 is satisfied (YES in S70), the processing proceeds to S100.

In S100, the ECU 300 determines whether or not the SOC that is computed in S10 exceeds the predetermined value Sc. In a case where the SOC does not exceed the predetermined value Sc (NO in S100), the processing proceeds to S104, and the ECU 300 opens the grille shutter 60. In S104, the ECU 300 sets the degree of the opening of the grille shutter 60 (for example, the angle that is formed by the traveling direction L of the vehicle 1 illustrated in FIG. 2 and the respective fins 62) to a specified value for the normal control.

In a case where the SOC exceeds the predetermined value Sc (YES in S100), in contrast, the processing proceeds to S102, and the ECU 300 opens the grille shutter 60. In S102, the ECU 300 sets a value exceeding the above-described specified value for the normal control as the degree of the opening of the grille shutter 60.

As described above, a higher degree of opening is set for the grille shutter 60 in a case where the SOC of the battery 150 exceeds the predetermined value Sc than in a case where the SOC does not exceed the predetermined value Sc according to the fifth embodiment. Accordingly, the air resistance increases, the amount of electric power consumption by the second motor generator 20 becomes more likely to increase, and thus the SOC of the battery 150 becomes likely to be reduced. Accordingly, a state where the SOC of the battery 150 becomes excessive can be avoided, and thus the deterioration of the battery 150 can become less likely to proceed and the battery 150 can be prevented from reaching an over-charged state.

The opening control described in the first to fifth embodiments can be appropriately combined as well. For example, the control for changing the parameter range for opening the grille shutter 60 according to the fourth embodiment or the control for adjusting the degree of the opening of the grille shutter 60 according to the fifth embodiment can be applied to the second and third embodiments.

In general, an upper limit value as to how many times the grille shutter can be opened and closed is specified for the grille shutter in view of durability (service life) and regarding the specifications of the grille shutter. The ECU 300 may hold the number of times of the opening and closing of the grille shutter 60 in the memory (not illustrated) and may make the opening control less likely to be executed in a case where the cumulative value of the number of times of the opening and closing exceeds a predetermined value (value that is determined based on the upper limit value described above). In this case, the possibility of the malfunctioning of the grille shutter can be reduced.

It should be noted that the embodiment disclosed herein is exemplary in every aspect and does not limit the invention. The scope of the invention is clarified by the claims, not the description above, and the invention includes any change within the meaning and range equivalent to the claims.

What is claimed is:

1. A vehicle comprising:
an electric power storage device;
electric motors configured to generate driving force for the vehicle by using an electric power stored in the electric power storage device;
a grille shutter configured to introduce air into the vehicle from the outside of the vehicle; and
at least one electronic control unit configured to:
(i) control the electric motors and the grille shutter,
(ii) calculate a state of charge of the electric power storage device, and
(iii) execute opening control of the grille shutter such that a first amount of the air exceeds a second amount of the air, the first amount of the air being an amount of the air introduced into the vehicle from the outside of the vehicle when the state of charge of the electric power storage device exceeds a predetermined value, and the second amount of the air being an amount of the air introduced into the vehicle from the outside of the vehicle when the state of charge does not exceed the predetermined value.

2. The vehicle according to claim 1,
wherein the electronic control unit is configured to adjust the amount of the air introduced into the vehicle from the outside of the vehicle depending on a frequency of the opening of the grille shutter, and
the electronic control unit is configured to perform the opening control such that a first frequency of the opening of the grille shutter exceeds a second frequency of the opening of the grille shutter, the first frequency is the frequency of the opening of the grille shutter when the state of charge of the electric power storage device exceeds the predetermined value, and the second frequency is the frequency of the opening of the grille shutter when the state of charge does not exceed the predetermined value.

3. The vehicle according to claim 1,
wherein the electronic control unit is configured to adjust the amount of the air introduced into the vehicle from the outside of the vehicle depending on degree of the opening of the grille shutter, and
the electronic control unit is configured to perform the opening control such that a first degree of the opening of the grille shutter exceeds a second degree of the opening of the grille shutter, the first degree is the degree of the opening of the grille shutter when the state of charge of the electric power storage device exceeds the predetermined value, and the second degree is the degree of the opening of the grille shutter when the state of charge does not exceed the predetermined value.

4. The vehicle according claim 1,
wherein the electronic control unit is configured to reduce occurrence of the opening control when the driving force output from the electric motors does not exceed a predetermined reference value, as compared to occurrence of the opening control when the driving force output from the electric motors exceeds the predetermined reference value.

5. The vehicle according to claim 1,
wherein the electronic control unit is configured to reduce occurrence of the opening control when the electric power supplied from the electric power storage device to the electric motors does not exceed a predetermined reference value, as compared to occurrence of the opening control when the electric power supplied from the electric power storage device to the electric motors exceeds the predetermined reference value.

6. The vehicle according to claim 1, further comprising an internal combustion engine,
wherein the electronic control unit is configured to reduce occurrence of the opening control when a driving force output from the internal combustion engine does not exceed a predetermined reference value, as compared to occurrence of the opening control when the driving force output from the internal combustion engine exceeds the predetermined reference value.

7. The vehicle according to claim 6,
wherein the electronic control unit is configured to reduce occurrence of the opening control when an amount of remaining fuel for the internal combustion engine does not exceed a predetermined threshold, as compared to occurrence of the opening control when the amount of remaining fuel exceeds the predetermined threshold.

8. The vehicle according to claims 1,
wherein the electronic control unit is configured to perform control such that the grille shutter is forced to be opened when the state of charge exceeds the predetermined value.

9. The vehicle according to claim 1,
wherein the electronic control unit is configured to perform control such that opening of the grille shutter is executed with a wider parameter range when the state of charge does not exceed the predetermined value, as compared to opening of the grille shutter being executed when the state of charge exceeds the predetermined value.

10. A control method for a vehicle, the vehicle including an electric power storage device,
electric motors configured to generate driving force for the vehicle by using an electric power stored in the electric power storage device,
a grille shutter configured to introduce air into the vehicle from the outside of the vehicle, and
an electronic control unit,
the control method comprising:
computing a state of charge of the electric power storage device, by the electronic control unit; and
controlling the grille shutter, by the electronic control unit, such that a first amount of the air exceeds a second amount of the air, the first amount of the air being an amount of the air introduced into the vehicle from the outside of the vehicle when the state of charge of the electric power storage device exceeds a predetermined value, and the second amount of the air being an amount of the air introduced into the vehicle from the outside of the vehicle when the state of charge does not exceed the predetermined value.

11. The control method according to claim 10,
wherein a frequency of the opening of the grille shutter is controlled, when the amount of the air is adjusted, such that a first frequency of the opening of the grille shutter exceeds a second frequency of the opening of the grille shutter, the first frequency is the frequency of the opening of the grille shutter when the state of charge exceeds the predetermined value, and the second frequency is the frequency of the opening of the grille shutter when the state of charge does not exceed the predetermined value.

12. The control method according to claim 10,
wherein a degree of the opening of the grille shutter is controlled, when the amount of the air is adjusted, such that a first degree of the opening of the grille shutter exceeds a second degree of the opening of the grille shutter, the first degree is the degree of the opening of the grille shutter when the state of charge exceeds the predetermined value, and the second degree is the degree of the opening of the grille shutter when the state of charge does not exceed the predetermined value.

* * * * *